(12) United States Patent
Yamauchi et al.

(10) Patent No.: US 12,270,725 B2
(45) Date of Patent: Apr. 8, 2025

(54) LIFE CONSUMPTION ESTIMATION DEVICE

(71) Applicant: MITSUBISHI HEAVY INDUSTRIES, LTD., Tokyo (JP)

(72) Inventors: Takahiro Yamauchi, Kanagawa (JP); Toshihiko Niinomi, Tokyo (JP); Satoru Mouri, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 148 days.

(21) Appl. No.: 17/928,464

(22) PCT Filed: Jun. 17, 2021

(86) PCT No.: PCT/JP2021/023058
§ 371 (c)(1),
(2) Date: Nov. 29, 2022

(87) PCT Pub. No.: WO2021/256539
PCT Pub. Date: Dec. 23, 2021

(65) Prior Publication Data
US 2023/0213410 A1 Jul. 6, 2023

(30) Foreign Application Priority Data
Jun. 17, 2020 (JP) .................... 2020-104451

(51) Int. Cl.
*G01M 15/14* (2006.01)
*F01D 21/00* (2006.01)
*F02C 7/00* (2006.01)

(52) U.S. Cl.
CPC ......... *G01M 15/14* (2013.01); *F01D 21/003* (2013.01); *F02C 7/00* (2013.01); *F05D 2220/32* (2013.01);
(Continued)

(58) Field of Classification Search
CPC ............. F01D 21/003; F05D 2260/80; F05D 2260/821; G01M 15/14; G05B 23/0283
See application file for complete search history.

(56) References Cited

U.S. PATENT DOCUMENTS

| 2004/0064255 A1* | 4/2004 | Egi .................. G06Q 40/00 702/3 |
| 2004/0073400 A1 | 4/2004 | Tomita et al. |

(Continued)

FOREIGN PATENT DOCUMENTS

| CN | 106647325 A | * 5/2017 | ........... F01K 13/02 |
| CN | 109615149 A | * 4/2019 | ........... G06F 17/18 |

(Continued)

OTHER PUBLICATIONS

International Search Report issued Jul. 27, 2021 in International Application No. PCT/JP2021/023058.

*Primary Examiner* — Topaz L. Elliott
(74) *Attorney, Agent, or Firm* — Wenderoth, Lind & Ponack, L.L.P.

(57) ABSTRACT

A life consumption estimation device for estimating life consumption of at least one part of a gas turbine includes: a predicted air temperature information acquisition unit configured to acquire predicted air temperature information regarding a future air temperature; a predicted load information acquisition unit configured to acquire predicted load information regarding a future load of the gas turbine; a gas turbine state quantity estimation unit configured to estimate at least one gas turbine state quantity regarding a future state quantity of the gas turbine, on the basis of predicted air temperature information acquired by the predicted air temperature information acquisition unit and the predicted load information acquired by the predicted load information acquisition unit; and a life consumption estimation unit configured to estimate the life consumption of the at least (Continued)

one part, on the basis of the gas turbine state quantity estimated by the gas turbine state quantity estimation unit.

12 Claims, 22 Drawing Sheets

(52) U.S. Cl.
  CPC .... *F05D 2260/80* (2013.01); *F05D 2260/821* (2013.01)

(56) References Cited

U.S. PATENT DOCUMENTS

| | | | | |
|---|---|---|---|---|
| 2004/0148129 A1* | 7/2004 | Gotoh | ................ | G05B 23/0229 |
| | | | | 702/183 |
| 2014/0058572 A1* | 2/2014 | Stein | ...................... | G06Q 50/06 |
| | | | | 700/291 |
| 2016/0160762 A1* | 6/2016 | Chandra | ............ | G05B 23/0283 |
| | | | | 701/100 |
| 2016/0231716 A1* | 8/2016 | Johnson | ............... | G05B 13/041 |
| 2018/0284706 A1* | 10/2018 | Anubi | .................. | G05B 19/042 |
| 2021/0108999 A1* | 4/2021 | Aoyama | ................. | G01N 3/06 |

FOREIGN PATENT DOCUMENTS

| | | | | |
|---|---|---|---|---|
| EP | 2172887 A2 * | 4/2010 | ............ | G06Q 10/04 |
| JP | 2004-38795 | 2/2004 | | |
| JP | 2004-156580 | 6/2004 | | |
| JP | 2013-109566 | 6/2013 | | |
| JP | 2018092369 A * | 6/2018 | ................ | F02C 9/00 |
| WO | 2002/103177 | 12/2002 | | |

* cited by examiner

FIG. 4

| Month | Average minimum temperature/C° |
|---|---|
| 2020/1 | |
| 2020/2 | |
| 2020/3 | |
| . | |
| . | |
| 2020/12 | |

FIG. 5

| Time period | Peak load /MW | Average load /MW |
|---|---|---|
| 0 | | |
| 1 | | |
| 2 | | |
| . | | |
| . | | |
| 23 | | |

FIG. 6

| Month | Availability factor /% | Number of starts /times |
|---|---|---|
| 2020/1 | 80% | 15 |
| 2020/2 | . | . |
| 2020/3 | . | . |
| . | . | . |
| . | . | . |
| 2020/12 | . | . |

FIG. 7

| Month | Time period | Probability of each air temperature range (°C) | | | |
|---|---|---|---|---|---|
| | | 0-5 | 5-10 | ... | 30-35 |
| 2020/1 | 0 | 0% | 10% | ... | 5% |
| | 1 | . | . | ... | . |
| | 2 | . | . | ... | . |
| | . | . | . | ... | . |
| | . | . | . | ... | . |
| | 23 | . | . | ... | . |
| 2020/2 | . | . | . | ... | . |
| | . | . | . | ... | . |
| | . | . | . | ... | . |
| . | . | . | . | ... | . |
| | . | . | . | ... | . |
| | . | . | . | ... | . |
| . | . | . | . | ... | . |
| | . | . | . | ... | . |
| | . | . | . | ... | . |
| 2020/12 | . | . | . | ... | . |
| | . | . | . | ... | . |
| | 23 | . | . | ... | . |

FIG. 8

| Pattern No. | Difference between temperature of each time period and minimum temperature/°C | | | |
|---|---|---|---|---|
| | 0 | 1 | ... | 23 |
| 1 | | | | |
| 2 | | | | |
| 3 | | | | |
| . | | | | |
| . | | | | |
| 12 | | | | |

FIG. 9

| Pattern No. | Minimum temperature range/°C | | | |
|---|---|---|---|---|
| | 0-5 | 5-10 | ... | 25-30 |
| 1 | 0% | | | 10% |
| 2 | 10% | | | 5% |
| 3 | 5% | | | 15% |
| . | . | | | . |
| . | . | | | . |
| 12 | 0% | | | 5% |
| Total | 100% | 100% | | 100% |

FIG. 10

| Time | Air temperature/°C |
|---|---|
| 2019/1/1 0:00 | 18 |
| 2019/1/1 1:00 | 17 |
| 2019/1/1 2:00 | 17 |
| 2019/1/1 3:00 | 16 |
| . | . |
| . | . |
| . | . |
| . | . |
| . | . |
| . | . |
| . | . |
| 2019/12/31 23:00 | 20 |

FIG. 11

| Date | Minimum temperature/°C | Difference between temperature at each time and minimum temperature/°C | | | |
|---|---|---|---|---|---|
| | | 0 | 1 | ... | 23 |
| 2019/1/1 | 12 | 6 | 5 | ... | . |
| 2019/1/2 | 14 | . | . | ... | . |
| 2019/1/3 | 8 | . | . | ... | . |
| . | . | . | . | ... | . |
| . | . | . | . | ... | . |
| . | . | . | . | ... | . |
| . | . | . | . | ... | . |
| . | . | . | . | ... | . |
| 2019/12/31 | 9 | . | . | ... | 11 |

FIG. 13

| Month | σ/°C |
|---|---|
| 2019/1 | |
| 2019/2 | |
| 2019/3 | |
| . | |
| . | |
| 2019/12 | |

FIG. 14

| Date | Minimum temperature/°C |
|---|---|
| 2020/1/1 | 9 |
| 2020/1/2 | 11 |
| 2020/1/3 | 8 |
| . | . |
| . | . |
| . | . |
| . | . |
| . | . |
| 2020/12/31 | 14 |

FIG. 15

| Date | Minimum temperature range | Pattern No. |
|---|---|---|
| 2020/1/1 | 5-10 | 2 |
| 2020/1/2 | 10-15 | 8 |
| 2020/1/3 | 5-10 | 4 |
| . | . | . |
| . | . | . |
| . | . | . |
| . | . | . |
| . | . | . |
| 2020/12/31 | 10-15 | 12 |

FIG. 16

| Time | Air temperature /°C |
|---|---|
| 2020/1/1 0:00 | 18 |
| 2020/1/1 1:00 | 17 |
| 2020/1/1 2:00 | 17 |
| 2020/1/1 3:00 | 16 |
| . | . |
| . | . |
| . | . |
| . | . |
| . | . |
| . | . |
| . | . |
| 2020/12/31 23:00 | 20 |

FIG. 17

| Time period | Probability of each load range (MW) | | | |
|---|---|---|---|---|
| | 0-100 | 100-120 | ... | 240-260 |
| 0 | 0% | 10% | ... | 40% |
| 1 | . | . | ... | . |
| 2 | . | . | ... | . |
| . | . | . | ... | . |
| . | . | . | ... | . |
| 23 | . | . | ... | . |

FIG. 18

| Time period | Probability of each load range (MW) | | | |
|---|---|---|---|---|
| | 0-100 | 100-120 | ... | 240-260 |
| 0 | 0% | 5% | ... | 50% |
| 1 | . | . | ... | . |
| 2 | . | . | ... | . |
| . | . | . | ... | . |
| . | . | . | ... | . |
| 23 | . | . | ... | . |

FIG. 19

| Month | Time period | Peak load /MW | T1T°C for each air temperature range | | | | Probability of each air temperature range (°C) | | | | T1T weighted mean/°C |
|---|---|---|---|---|---|---|---|---|---|---|---|
| | | | 0-5 | 5-10 | ... | 30-35 | 0-5 | 5-10 | ... | 30-35 | |
| 2020/1 | 0 | 250 | 1480 | 1485 | ... | 1500 | 0% | 10% | ... | 5% | 1492 |
| | 1 | 250 | 1480 | 1485 | ... | 1500 | | | | | |
| | 2 | 200 | 1380 | 1385 | ... | 1400 | | | | | |
| | . | | | | | | | | | | |
| | . | | | | | | | | | | |
| | 23 | 180 | | | | | | | | | |
| 2020/2 | 0 | 250 | | | | | | | | | |
| | 1 | 250 | | | | | | | | | |
| . | . | | | | | | | | | | |
| . | . | | | | | | | | | | |
| 2020/12 | 23 | 180 | | | | | | | | | |

FIG. 20

| Month | Time period | T1T weighted mean /°C | LFEOHv1 /h | Peak load factor /% | Availability factor /% | LFEOHv2 /h |
|---|---|---|---|---|---|---|
| 2020/1 | 0 | 1492 | 28 | 40% | 80% | 8.96 |
| | 1 | | | | | |
| | 2 | | | | | |
| | ... | | | | | |
| | 23 | | | | | |
| 2020/2 | 0 | | | | | |
| | 1 | | | | | |
| | ... | | | | | |
| ... | ... | | | | | |
| 2020/12 | ... | | | | | |
| | 23 | | | | | |

FIG. 21

| Month | Σ LFEOHv2 /month | A × NS /month | LFEOHv3 /month |
|---|---|---|---|
| 2020/1 | 150 | 90 | 240 |
| 2020/2 | . | . | . |
| . | . | . | . |
| . | . | . | . |
| 2020/12 | 170 | . | . |

LIFE CONSUMPTION ESTIMATION DEVICE

TECHNICAL FIELD

The present disclosure relates to a life consumption estimation device.

The present application claims priority based on Japanese Patent Application No. 2020-104451 filed on Jun. 17, 2020, the entire content of which is incorporated herein by reference.

BACKGROUND ART

Patent Document 1 discloses a gas turbine state diagnosis method in which an equivalent operating time is calculated during operation to evaluate the degree of damage to a part constituting the gas turbine by the operating time using operating information of the gas turbine and process information measured during operation of the gas turbine, and the state of the gas turbine is diagnosed based on the calculated equivalent operating time and a previously determined management criterion.

If the calculated equivalent operating time is smaller than the management criterion of each device, the remaining life is calculated. It is described here that methods based on regression analysis of previous data, methods based on the design basis operating pattern, and methods based on the rate of change (derivative value) at the time of evaluation may be used to calculate the remaining life.

CITATION LIST

Patent Literature

Patent Document 1: Domestic re-publication of PCT international application No. 2002/103177

SUMMARY

Problems to be Solved

For example, when determining the remaining life of a part of a gas turbine by the method described in Patent Document 1, since parameters that affect the future life consumption of the part are not properly considered, the future life consumption of the part cannot be accurately estimated, and the accuracy of estimating the remaining life of the part tends to be limited.

In view of the above circumstances, an object of the present disclosure is to provide a life consumption estimation device that can accurately estimate the future life consumption of a part of a gas turbine.

Solution to the Problems

To accomplish the above object, a life consumption estimation device according to the present disclosure is a life consumption estimation device for estimating life consumption of at least one part of a gas turbine, comprising: a predicted air temperature information acquisition unit configured to acquire predicted air temperature information regarding a future air temperature; a predicted load information acquisition unit configured to acquire predicted load information regarding a future load of the gas turbine; a gas turbine state quantity estimation unit configured to estimate at least one gas turbine state quantity regarding a future state quantity of the gas turbine, on the basis of the predicted air temperature information acquired by the predicted air temperature information acquisition unit and the predicted load information acquired by the predicted load information acquisition unit; and a life consumption estimation unit configured to estimate the life consumption of the at least one part, on the basis of the at least one gas turbine state quantity estimated by the gas turbine state quantity estimation unit.

Advantageous Effects

The present disclosure provides a life consumption estimation device that can accurately estimate the future life consumption of a part of a gas turbine.

BRIEF DESCRIPTION OF DRAWINGS

FIG. 4 is a diagram for describing information the input of which is received by the predicted air temperature input receiving unit 12.

FIG. 5 is a diagram for describing part of information the input of which is received by the predicted load input receiving unit 18.

FIG. 6 is a diagram for describing part of information the input of which is received by the predicted load input receiving unit 18.

FIG. 7 is a diagram for describing air temperature frequency distribution information S.

FIG. 8 is a diagram for describing a plurality of change patterns showing patterns of air temperature change over time in a day.

FIG. 9 is a diagram showing the appearance frequency of each of the plurality of change patterns for each minimum temperature range to which the daily minimum temperature belongs.

FIG. 10 is a diagram for describing statistical data of air temperature for each time of day in past.

FIG. 11 is a diagram for describing change pattern information.

FIG. 13 is a diagram showing the standard deviation a of minimum temperatures for each month in the past.

FIG. 14 is a diagram showing minimum temperatures randomly and simulatively generated for each day in future.

FIG. 15 is a diagram for describing a method of assigning an air temperature change pattern to each day in future.

FIG. 16 is a diagram showing temperatures generated for each time in each date in future.

FIG. 17 is a diagram for describing load frequency distribution information L in future.

FIG. 18 is a diagram for describing load frequency distribution information in past.

FIG. 19 is a diagram showing peak load for each time period, turbine inlet temperature T1T for each air temperature range, etc., in future.

FIG. 20 is a diagram showing life consumption LFEOHv2 of a gas turbine part for each time period in an evaluation period in future.

FIG. 21 is a diagram showing life consumption LFEOHv3 for each month in an evaluation period in future.

DETAILED DESCRIPTION

Figure 1:
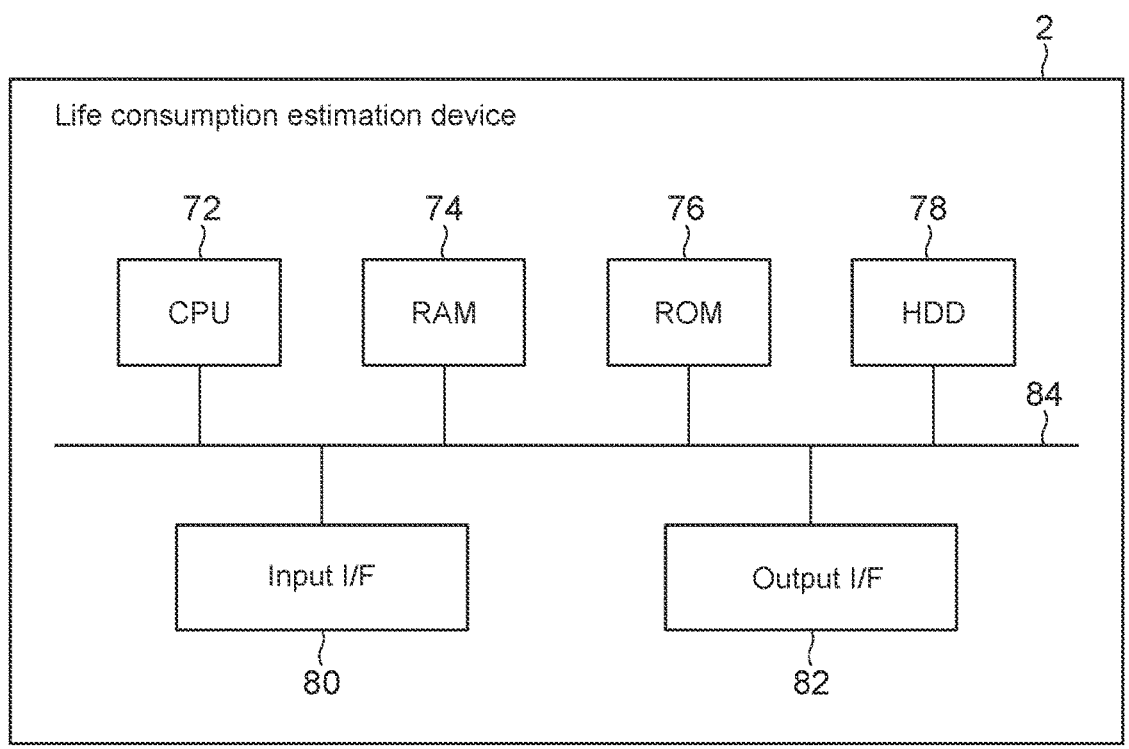
FIG. 1 is a block diagram showing a schematic hardware configuration of a life consumption estimation device 2 according to an embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 2:
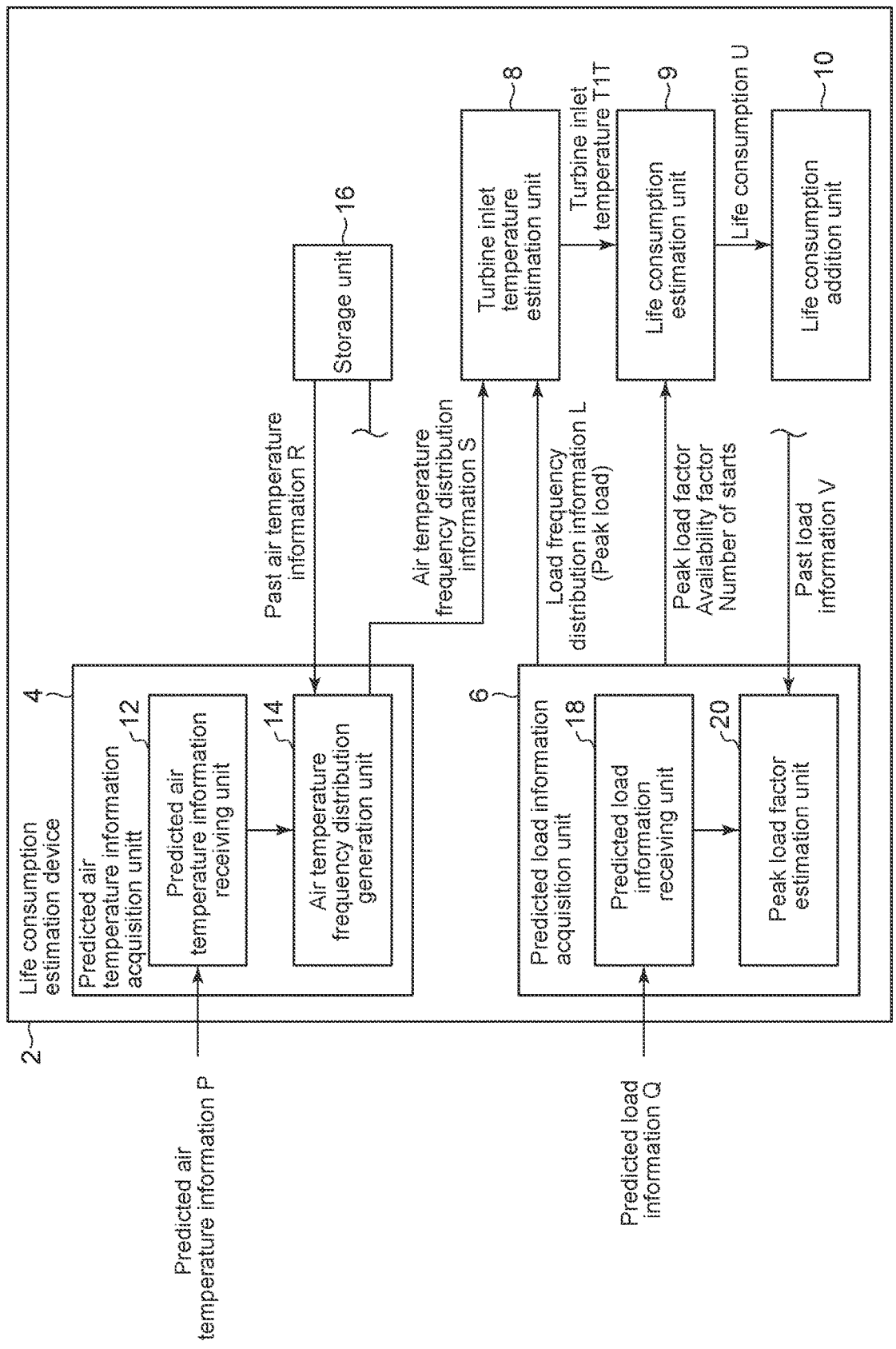
FIG. 2 is a block diagram showing a functional schematic configuration of the life consumption estimation device 2 shown in FIG. 1.

FIG. 1 is a block diagram showing a schematic hardware configuration of a life consumption estimation device 2 according to an embodiment. FIG. 2 is a block diagram showing a functional schematic configuration of the life consumption estimation device 2 shown in FIG. 1.

As shown in FIG. 1, the life consumption estimation device 2 is provided by a computer including a central processing unit (CPU) 72, a random access memory (RAM) 74, a read only memory (ROM) 76, a hard disk drive (HDD) 78, an input I/F 80, and an output I/F 82, which are connected via a bus 84. The hardware configuration of the life consumption estimation device 2 is limited thereto, and may be configured by a combination of a control circuit and a storage device. The life consumption estimation device 2 is provided by executing a program that realizes each function of the life consumption estimation device 2 by the computer. The function of each unit of the life consumption estimation device 2 described below is realized by, for instance, loading a program stored in the ROM 76 into the RAM 74 and executing the program by the CPU 72, and reading and writing data in the RAM 74 or the ROM 76.

As shown in FIG. 1, the life consumption estimation device 2 includes a predicted air temperature information acquisition unit 4, a predicted load information acquisition unit 6, a turbine inlet temperature estimation unit 8 (gas turbine state quantity estimation unit), a life consumption estimation unit 9, and a life consumption addition unit 10, and is configured to estimate life consumption of at least one part of a gas turbine. The gas turbine part is a hot part whose life consumption changes with the load of the gas turbine, such as a combustor liner, a combustor transition piece, a turbine stator vane, or a turbine rotor blade of the gas turbine. Further, hereinafter, "turbine inlet temperature" means the temperature of combustion gas at the inlet of a turbine of the gas turbine.

The predicted air temperature information acquisition unit 4 includes a predicted air temperature input receiving unit 12 and an air temperature frequency distribution generation unit 14. The predicted air temperature input receiving unit 12 is configured to receive the input of predicted air temperature information P regarding a future air temperature, and the predicted air temperature information acquisition unit 4 acquires the predicted air temperature information P via the predicted air temperature input receiving unit 12. The predicted air temperature information P may be, for example, information about a daily minimum temperature in future. In this case, for example, the information may be an average value obtained by averaging daily minimum temperatures for each month (average minimum temperature of each month). The predicted air temperature input receiving unit 12 may receive the input of the predicted air temperature information P via an input device (not shown) disposed outside the life consumption estimation device 2, or may receive the input of the predicted air temperature information P via an input device (e.g., the above-described input I/F 80) disposed inside the life consumption estimation device 2.

The air temperature frequency distribution generation unit 14 is configured to generate air temperature frequency distribution information S indicating a frequency distribution of air temperatures for each time period in future (a frequency distribution indicating the relationship between air temperature and appearance frequency of that air temperature for each time period in future), on the basis of past air temperature information R regarding a past air temperature and the predicted air temperature information P the input of which is received by the predicted air temperature input receiving unit 12. The past air temperature information R includes a plurality of change patterns of air temperature change over time in a day and an appearance frequency of each of the plurality of change patterns. The plurality of change patterns and the appearance frequency thereof are created based on statistical information of the past air temperature. In the illustrated exemplary embodiment, the past air temperature information R including the plurality of change patterns and the appearance frequency of each of the change patterns is stored in a storage unit 16, and the air temperature frequency distribution generation unit 14 generates the air temperature frequency distribution information S, on the basis of the plurality of change patterns and the appearance frequency of each of the plurality of change patterns read from the storage unit 16 and the predicted air temperature information P the input of which is received by the predicted air temperature input receiving unit 12.

The predicted load information acquisition unit 6 includes a predicted load input receiving unit 18 and a peak load factor estimation unit 20. The predicted load input receiving unit 18 is configured to receive the input of predicted load information Q regarding a future load of the gas turbine, and the predicted load information acquisition unit 6 acquires the predicted load information Q via the predicted load input receiving unit 18.

The predicted load information Q includes, for example, a predicted value of a peak load for each time period in future (predicted peak load for each time period in future), a predicted value of an average load for each time period in future (predicted average load for each time period in future), a predicted value of an availability factor of the gas turbine in future (predicted availability factor of the gas turbine in future), and a predicted value of the number of starts of the gas turbine in future (predicted number of starts of the gas turbine in future). The predicted load input receiving unit 18 may receive the input of the predicted load information Q via an input device (not shown) disposed outside the life consumption estimation device 2, or may receive the input of the predicted load information Q via an input device (e.g., the above-described input I/F 80) disposed inside the life consumption estimation device 2.

The peak load factor estimation unit 20 is configured to estimate a peak load factor which is a ratio of time of peak load in each time period in future (the proportion of time during which the gas turbine load is at peak load in each time period), on the basis of past load information V regarding a past load and the predicted load information Q the input of which is received by the predicted load input receiving unit 18.

The past load information V includes load frequency distribution information indicating a frequency distribution of loads of the gas turbine for each time period in past (a frequency distribution indicating the relationship between load of the gas turbine and appearance frequency of that load for each time period in past). In the illustrated exemplary embodiment, the past load information V including the past load frequency distribution information is stored in the storage unit 16, and the peak load factor estimation unit 20 estimates the peak load factor for each time period in future, on the basis of the past load frequency distribution information read from the storage unit 16 and the predicted load information Q the input of which is received by the predicted load input receiving unit 18.

For example, the peak load factor estimation unit 20 estimates the peak load factor for each time period in future, on the basis of the past load frequency distribution information read from the storage unit 16, a predicted peak load for each time period the input of which is received by the predicted load input receiving unit 18, and a predicted value of the average load for each time period the input of which is received by the predicted load input receiving unit 18. The peak load factor estimation unit 20 may not only estimate the peak load factor for each time period in future but also generate load frequency distribution information L indicating a frequency distribution of loads for each time period in future (a frequency distribution indicating the relationship between load and appearance frequency of that load for each time period in future), on the basis of the past load frequency distribution information, a predicted value of the peak load for each time period, and a predicted value of the average load for each time period.

The turbine inlet temperature estimation unit 8 is configured to estimate a future turbine inlet temperature T1T as a gas turbine state quantity regarding a future state quantity of the gas turbine, on the basis of the predicted air temperature information P acquired by the predicted air temperature information acquisition unit 4 and the predicted load information Q acquired by the predicted load information acquisition unit 6. For example, the turbine inlet temperature estimation unit 8 calculates a weighted mean of the turbine inlet temperature TIT for each time period in future, on the basis of the air temperature frequency distribution information S generated by the air temperature frequency distribution generation unit 14 and the load frequency distribution information L indicating a frequency distribution of loads for each time period in future estimated by the peak load factor estimation unit 20. In this case, the turbine inlet temperature estimation unit 8 may use only a predicted value of the peak load, the input of which is received by the predicted load input receiving unit 18, of the load frequency distribution in the load frequency distribution information L for calculating the weighted mean. In this case, the turbine inlet temperature estimation unit 8 estimates the turbine inlet temperature T1T for each time period in future, on the basis of the air temperature frequency distribution information S generated by the air temperature frequency distribution generation unit 14 and the predicted value of the peak load for each time period in future the input of which is received by the predicted load input receiving unit 18.

The life consumption estimation unit 9 is configured to estimate the life consumption U of at least one part of the gas turbine, on the basis of the turbine inlet temperature T1T for each time period in future estimated by the turbine inlet temperature estimation unit 8, the peak load factor for each time period in future estimated by the peak load factor estimation unit 20, a predicted value of the availability factor the input of which is received by the predicted load input receiving unit 18, and a predicted number of starts the input of which is received by the predicted load input receiving unit 18.

The life consumption addition unit 10 is configured to add the life consumption U of the part estimated by the life consumption estimation unit 9 to past life consumption of the part.

Next, a specific example of a flowchart for estimating the life consumption U of a gas turbine part by the life consumption estimation device 2 will be described with reference to FIG. 3.

Figure 3:
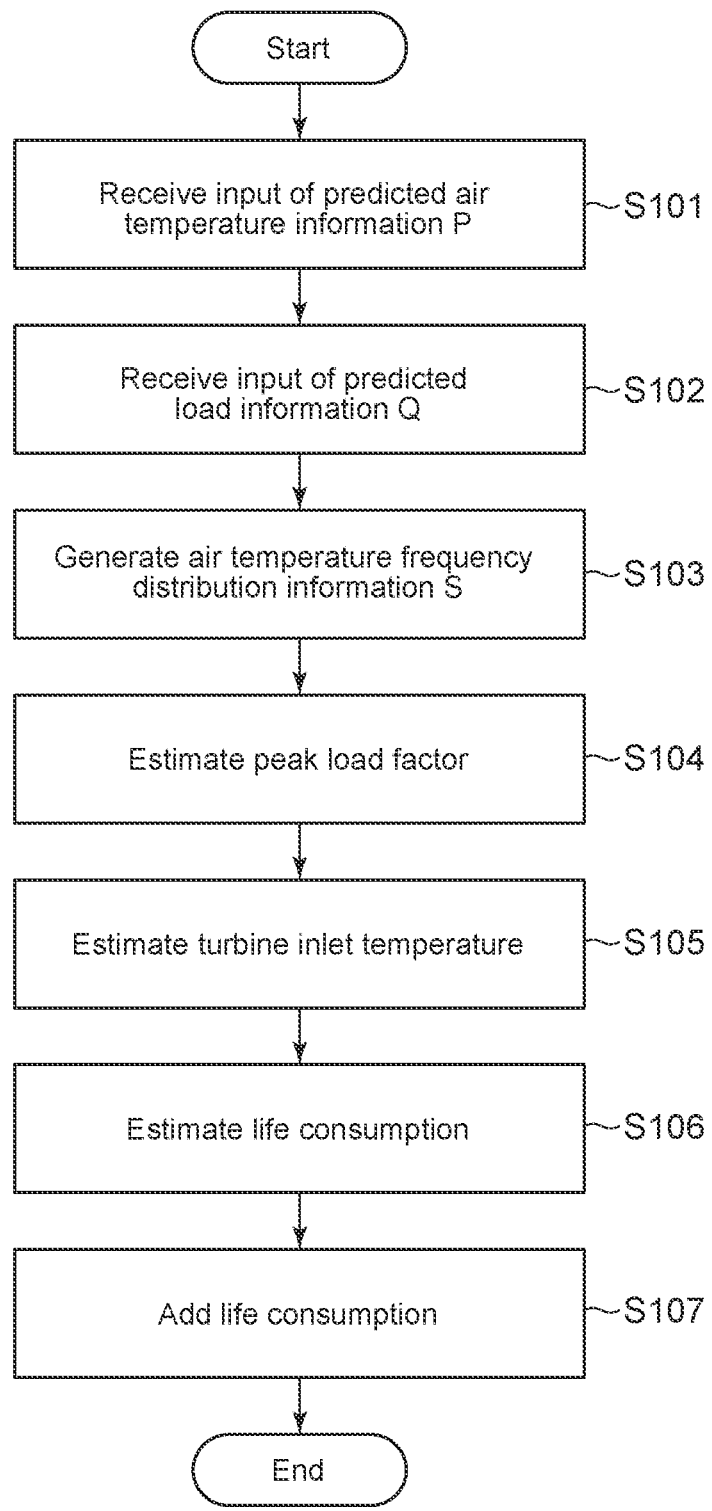
FIG. 3 is a flowchart showing an example of a method of estimating the life consumption of a gas turbine part by the life consumption estimation device 2.

FIG. 3 is an exemplary flowchart for estimating the life consumption U of a gas turbine part by the life consumption estimation device 2.

As shown in FIG. 3, in S101, the predicted air temperature input receiving unit 12 receives the input of predicted air temperature information P regarding a future air temperature. Here, as shown in FIG. 4, the predicted air temperature input receiving unit 12 receives the input of a predicted value of the average minimum temperature for each month as the predicted air temperature information P. The predicted value of the average minimum temperature for each month corresponds to an average value obtained by averaging daily minimum temperatures for each month, and is information about a future daily minimum temperature.

Then, in S102, the predicted load input receiving unit 18 receives the input of predicted load information Q regarding a future load of the gas turbine. Here, as shown in FIG. 5, the predicted load input receiving unit 18 receives a predicted value of the peak load of the gas turbine for each time period in future and a predicted value of the average load during operation of the gas turbine for each time period in future. Further, as shown in FIG. 6, the predicted load input receiving unit 18 receives a predicted value of the availability factor of the gas turbine for each month in future and a predicted number of starts of the gas turbine for each month in future.

Then, in S103, the air temperature frequency distribution generation unit 14 generates air temperature frequency distribution information S indicating a frequency distribution of air temperatures for each time period in each month in future, on the basis of past air temperature information R regarding a past air temperature and the predicted air temperature information P the input of which is received by the predicted air temperature input receiving unit 12, as shown in FIG. 7. The air temperature frequency distribution information S shown in FIG. 7 is information that divides a predetermined temperature range into multiple air temperature ranges by a predetermined temperature and shows the probability that the air temperature belongs to each air temperature range for each time period in each month in future. In the illustrated exemplary air temperature frequency distribution information S, a temperature range of 0 degrees to 35 degrees is divided into seven air temperature ranges by 5 degrees, and the probability that the air temperature belongs to each air temperature range is shown for each time period in each month in future.

In S103, the past air temperature information R regarding a past air temperature includes a plurality of change patterns showing patterns of air temperature change over time in a day (see FIG. 8) and an appearance frequency of each of the plurality of change patterns for each minimum temperature range to which the daily minimum temperature belongs (see FIG. 9).

Each of the plurality of change patterns shown in FIG. 8 is a change pattern of the difference between the temperature in each time period in a day and the daily minimum temperature. The appearance frequency of the change pattern shown in FIG. 9 divides a predetermined temperature range into multiple minimum temperature ranges by a predetermined temperature, and shows the appearance frequency (probability of occurrence) of each change pattern for each minimum temperature range to which the daily minimum temperature belongs. In the example shown in FIG. 9, a predetermined temperature range of 0 degrees to 30 degrees is divided into six minimum temperature ranges by 5 degrees, and the appearance frequency of each change pattern is shown for each minimum temperature range to which the daily minimum temperature belongs.

Here, an example of a method of generating a plurality of change patterns and their appearance frequencies will be described. First, statistical data of air temperature at each time of day in past, as shown in FIG. 10, is converted into change pattern information in which the daily minimum temperature is associated with the daily change pattern, which is the difference between the temperature at each time and the minimum temperature, as shown in FIG. 11, and the change patterns in this change pattern information are clustered into a plurality of change patterns as shown in FIG. 8. In the example shown in FIG. 8, the air temperature change patterns are clustered into 12 change patterns. Then, by organizing the change pattern information for each of the clustered change patterns, as shown in FIG. 9, the appearance frequency of each of the change patterns is generated for each minimum temperature range to which the daily minimum temperature belongs.

The past air temperature information R may be generated outside the life consumption estimation device 2 and stored in the storage unit 16, or may be generated by the life consumption estimation device 2 and stored in the storage unit 16, or may be acquired from the outside of the life consumption estimation device 2 and used to generate the air temperature frequency distribution information S by the air temperature frequency distribution generation unit 14 not via the storage unit 16.

Next, an example of a method of generating the air temperature frequency distribution information S in S103 will be described with reference to the flowchart of FIG. 12.

Figure 12:
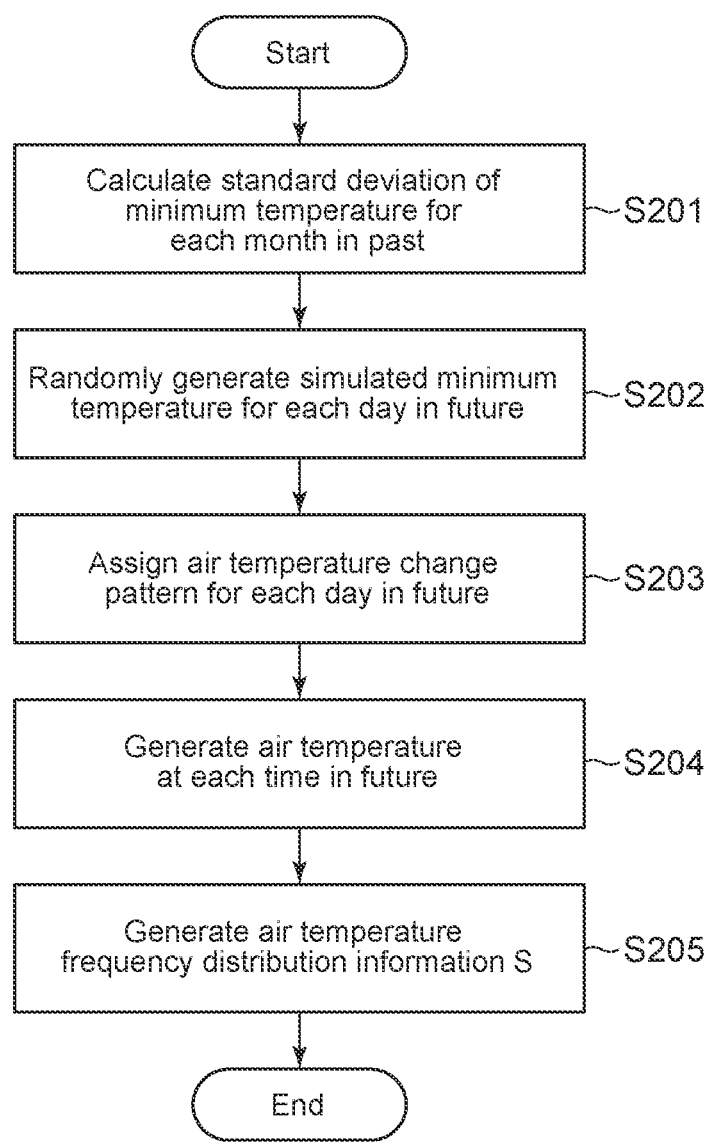
FIG. 12 is a flowchart showing an example of a method of generating air temperature frequency distribution information S.
Figure 13:
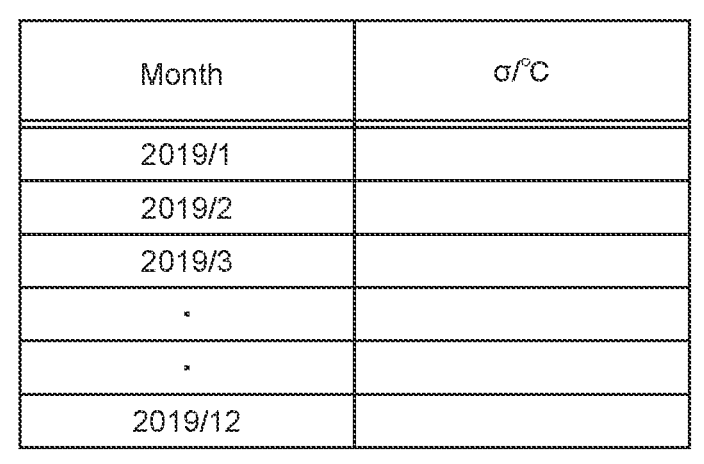

As shown in FIG. 12, in S201, on the basis of the daily minimum temperature in the change pattern information shown in FIG. 11, the standard deviation a of the minimum temperature is calculated for each month in past, as shown in FIG. 13. Then, in S202, on the basis of the standard deviation a of the minimum temperature for each month in past calculated in S201 and the predicted value of the average minimum temperature for each month in future included in the predicted air temperature information P acquired in S101, as shown in FIG. 14, a simulated minimum temperature according to a normal distribution having the above-described standard deviation a and average minimum temperature is randomly generated for each day in future.

Then, in S203, on the basis of the future daily minimum temperature generated in S202, the plurality of change patterns shown in FIG. 8, and the appearance frequency of each change pattern for each minimum temperature range shown in FIG. 9, as shown in FIG. 15, a simulated air temperature change pattern is randomly generated with the appearance frequency based on the minimum temperature range to which the future daily minimum temperature belongs, and is assigned to each day.

Then, in S204, on the basis of the future daily minimum temperature generated in S202, the air temperature change pattern assigned to each day in future in S203, and the air temperature difference between the minimum temperature and the temperature in each time period in each air temperature change pattern shown in FIG. 8, a predicted air temperature for each time is generated for each date in future, as shown in FIG. 16.

Then, in S205, by organizing the predicted air temperature for each time in each date in future generated in S204 for each time period in each month in future, the air temperature frequency distribution information S shown in FIG. 7 is generated.

Then, referring to FIG. 3 again, in S104, the peak load factor estimation unit 20 estimates a peak load factor which is a ratio of time of peak load in each time period in future, on the basis of past load information V regarding a past load and the predicted load information Q the input of which is received by the predicted load input receiving unit 18, as shown in FIG. 17. In the example shown in FIG. 17, the peak load factor estimation unit 20 generates a frequency distribution of loads of the gas turbine for each time period in future (a frequency distribution indicating the relationship between load and a predicted value of appearance frequency of that load for each time period in future) as the load frequency distribution information L including the peak load factor. The load frequency distribution information L shown in FIG. 17 is information that divides a predetermined load range into multiple load ranges and shows the probability that the load belongs to each load range for each time period in future.

In S104, as shown in FIG. 18, the past load information V regarding a past load includes past load frequency distribution information indicating a frequency distribution of loads of the gas turbine for each time period in past (a frequency distribution indicating the relationship between load of the gas turbine and appearance frequency of that load for each time period in past). The past load frequency distribution information shown in FIG. 18 is information that divides a predetermined load range into multiple load ranges and shows the probability that the load belongs to each load range for each time period in past. The past load frequency distribution information in the past load information V can be obtained, for example, by extracting the past load at each time from the past operating data of the gas turbine and organizing them.

In S104, the peak load factor estimation unit 20 generates the future load frequency distribution information L shown in FIG. 17 by changing the peak load in the past load frequency distribution information shown in FIG. 18 to the predicted value of the peak load in the predicted load information Q, and then adjusting the frequency of each load in the load frequency distribution information so that the average load in the load frequency distribution information coincides with the predicted value of the average load in the predicted load information Q.

The past load frequency distribution information in the past load information V may be generated outside the life consumption estimation device 2 and stored in the storage unit 16, or may be generated by the life consumption estimation device 2 and stored in the storage unit 16, or may be acquired from the outside of the life consumption estimation device 2 and used to generate the load frequency distribution information L including the peak load factor for each time period in future by the peak load factor estimation unit 20 not via the storage unit 16.

Then, in S105, on the basis of the air temperature frequency distribution information S generated in S103 and the load frequency distribution information L generated in S104, the turbine inlet temperature estimation unit 8 estimates the turbine inlet temperature T1T for each time period in future. Here, since the gas turbine peak load has a dominant influence on the turbine inlet temperature T1T over the other loads, the turbine inlet temperature estimation unit 8 may calculate the turbine inlet temperature T1T for each time period in each month in future, on the basis of the peak load for each time period in the load frequency distribution information L and the air temperature frequency distribution for each time period in each month in future in the air temperature frequency distribution information S. In this case, the weighted mean of the turbine inlet temperature may be calculated by weighting the temperature with the frequency of air temperature in the air temperature frequency distribution information S (the probability that the air temperature in each time period in future belongs to each air temperature range).

For example, in a certain time period t0, when a0 is the predicted value of the peak load (MW), Ti is the i-th air temperature in the air temperature frequency distribution information S (the temperature indicating the i-th air temperature range of n air temperature ranges, where n is the number of air temperature ranges in the air temperature frequency distribution information S), T1T (a0, Ti) is the turbine inlet temperature when the predicted value of the peak load is a0 and the air temperature is Ti, and pi is the frequency of occurrence of the air temperature Ti (the frequency that the air temperature belongs to the i-th temperature range), a weighted average T1Tt0 obtained by weighting the turbine inlet temperature T1T (a0, Ti) in the time period t0 with the frequency pi can be expressed by the following equation (1).

(Expression 1)

$$T1Tt0 = \sum_{i=1}^{n}(pi \times T1T(a0, Ti)) \quad (1)$$

That is, for example as shown in FIG. 19, the weighted mean of the turbine inlet temperature T1T can be calculated for each time period by calculating the turbine inlet temperature T1T (a0,Ti) based on the air temperature and the predicted value of the peak load for each air temperature range, multiplying the turbine inlet temperature T1T (a0,Ti) for each air temperature range by the frequency pi of that air temperature range, and adding the multiplication results of all air temperature ranges. Here, the relationship between the peak load, air temperature, and turbine inlet temperature T1T can be obtained from past operating data of the gas turbine. For example, it may be read from the storage unit 16 and used to estimate the turbine inlet temperature. In some embodiments, the gas turbine exhaust temperature may be calculated from the peak load and the air temperature, the gas turbine compression ratio may be calculated from the peak load, and the turbine inlet temperature may be calculated from the gas turbine exhaust temperature and the compression ratio.

Then, in S106, the life consumption estimation unit 9 estimates the future life consumption of the gas turbine part on the basis of the turbine inlet temperature T1T (in the above example, the weighted mean of the turbine inlet temperature TIT) for each time period in future estimated in S105.

A method of estimating the future life consumption of a gas turbine part by the life consumption estimation unit 9 will now be described. The life consumption in a future evaluation period of a gas turbine part can be estimated by the following method. The life consumption LF per unit time at a certain operating load can be estimated from state quantities of the gas turbine (e.g., turbine inlet temperature, pressure ratio, and/or exhaust gas temperature). By multiplying LF by operating time AOH of the gas turbine at that load, the life consumption LFEOH of the gas turbine in an evaluation period can be estimated. However, the above case only takes into consideration the influence of operating time, such as creep. Therefore, the influence of the number of starts of the gas turbine should also be added to calculate the actual LFEOH.

The life consumption LFEOHv2 of a gas turbine part for each time period (hourly in the illustrated example) in the evaluation period in future as shown in FIG. 20 can be calculated by multiplying LFEOHv1 by the peak load factor and the availability factor if the number of gas turbine starts is not considered. Here, LFEOHv1 is a hypothetical life consumption for each time period in future. LFEOHv1 has a positive correlation with the turbine inlet temperature T1T and is expressed as a function of the turbine inlet temperature T1T for each part of the gas turbine, for example. Information indicating the correlation between the turbine inlet temperature T1T and LFEOHv1 is stored, for example, in the storage unit 16 and read for calculating LFEOH.

The life consumption LFEOHv3 of the gas turbine part for each month in the evaluation period in future as shown in FIG. 21 can be calculated by adding to LFEOHv2 the influence of the number of starts on the life of the part.

Further, the life consumption LFEOH over the entire evaluation period from the present to a certain point in future is equal to an integrated value of LFEOHv3 integrated over the entire evaluation period from the present to the certain point in future.

Then, in S107, the past life consumption LFEOH of the part is added to the life consumption LFEOH of the part from the present to a certain point in future estimated in S106. As a result, it is possible to calculate the life consumption LFEOH from the start of use of the part to a certain point in future. Further, the remaining life of the part may be obtained by subtracting the life consumption LFEOH from the start of use of the part to a certain point in future calculated in S107 from the life of the part.

Next, a modification of life prediction based on the turbine inlet temperature TIT described in the present example will be described. In the above-described embodiments, the life consumption of the gas turbine is estimated based on the turbine inlet temperature TIT, which is an example of the gas turbine state quantity. However, the life consumption of the gas turbine may be estimated based on at least one gas turbine state quantity other than the turbine inlet temperature.

For example, since the combustion gas temperature to which the turbine rear stage is exposed is lower than the turbine inlet temperature TIT, the combustion gas temperature at a target stage of the gas turbine may be estimated and used to accurately predict the life of the turbine rear stage. Specifically, the gas turbine state estimation unit estimates the combustion gas temperature at each stage of the gas turbine, taking into consideration the temperature drop due to the mixing of cooling air and the expansion of the turbine from the pressure ratio and the predicted turbine inlet temperature TIT, and the life consumption estimation unit estimates the life consumption of a part at the target stage on the basis of the estimated combustion gas temperature of the target stage. Further, if low cycle fatigue (LCF) is more dominant than high temperature oxidation as a factor in life consumption of the part, after calculating the life consumption based on an integrated value of load change rate (% load/min) expected in future, the larger value compared to the estimated life consumption based on the turbine inlet temperature T1T described above can be adopted as an estimated value of life consumption.

Further, in predicting the end of life of a certain part, the estimated life consumption is generally compared with the remaining life of the part, but the remaining life can be calculated based on the repair history of the part (inspection records such as crack occurrence, TBC delamination) instead of using the nominal value.

Figure 22:
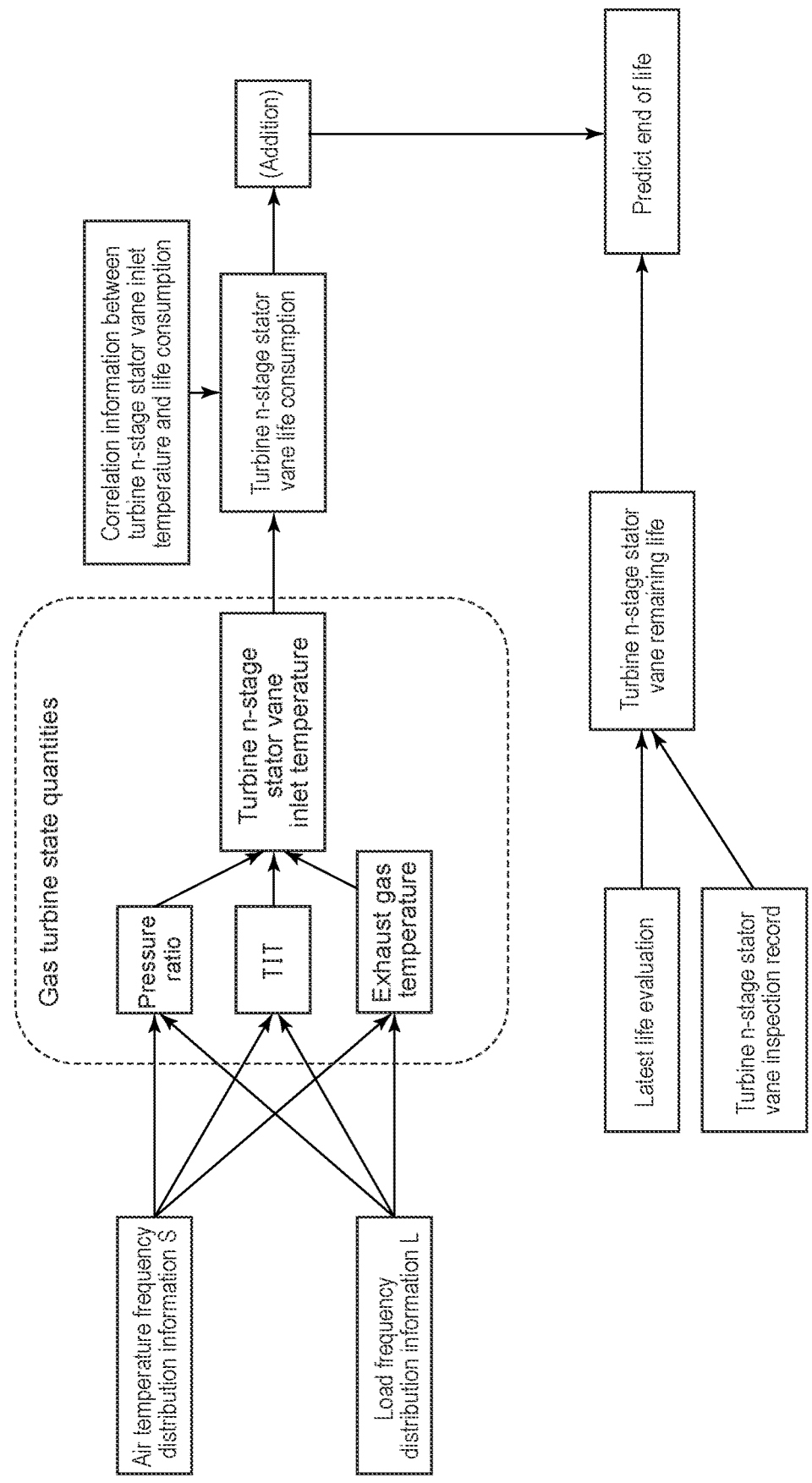
FIG. 22 is a diagram for describing a modification of life prediction based on turbine inlet temperature T1T.

For example, in the example shown in FIG. 22, the pressure ratio, the turbine inlet temperature TIT, and the exhaust gas temperature are calculated for each time period on the basis of the air temperature frequency distribution information S and the load frequency distribution information L, and the n-stage stator vane (n is an integer of 1 or more) of the gas turbine is calculated on the basis of them. Then, on the basis of the calculated inlet temperature of the n-stage stator vane and the correlation information between the inlet temperature of the n-stage stator vane and the life consumption of the n-stage stator vane, the life consumption of the n-stage stator vane in each time period is calculated, and an integrated value is calculated by integrating the calculated life consumption of the n-stage stator vane over the entire evaluation period. Further, the remaining life of the n-stage stator vane is calculated based on the latest life evaluation of the gas turbine, and this remaining life is compared with the above-described integrated value obtained by integrating the life consumption of the n-stage stator vane over the entire evaluation period to predict the end of life of the n-stage stator vane. In the example shown in FIG. 22, the pressure ratio, the turbine inlet temperature TIT, the exhaust gas temperature, and the n-stage stationary blade inlet temperature each correspond to the gas turbine state quantity regarding a future state quantity of the gas turbine.

All of the modifications described above can be applied in combination with each other.

The present disclosure is not limited to the embodiments described above, but includes modifications to the embodiments described above, and embodiments composed of combinations of those embodiments.

The contents described in the above embodiments would be understood as follows, for instance.

(1) A life consumption estimation device (e.g., the above-described life consumption estimation device 2) according to the present disclosure is a life consumption estimation device for estimating life consumption of at least one part of a gas turbine, comprising: a predicted air temperature information acquisition unit (e.g., the above-described predicted air temperature information acquisition unit 4) configured to acquire predicted air temperature information regarding a future air temperature; a predicted load information acquisition unit (e.g., the above-described predicted load information acquisition unit 6) configured to acquire predicted load information regarding a future load of the gas turbine; a gas turbine state quantity estimation unit (e.g., the above-described turbine inlet temperature estimation unit 8) configured to estimate at least one gas turbine state quantity regarding a future state quantity of the gas turbine, on the basis of the predicted air temperature information acquired by the predicted air temperature information acquisition unit and the predicted load information acquired by the predicted load information acquisition unit; and a life consumption estimation unit (e.g., the above-described life consumption estimation unit 9) configured to estimate the life consumption of the at least one part, on the basis of the at least one gas turbine state quantity estimated by the gas turbine state quantity estimation unit.

The life consumption of many parts used in a gas turbine correlates with gas turbine state quantities. Further, the gas turbine state quantities may have a correlation with the load of the gas turbine and the air temperature.

Then, in the life consumption estimation device described in the above (1), at least one gas turbine state quantity regarding a future state quantity of the gas turbine is estimated based on the predicted air temperature information and the predicted load information, and the life consumption of a gas turbine part is estimated based on the estimated gas turbine state quantity. Thus, it is possible to accurately estimate the life consumption of the gas turbine part on the basis of the gas turbine state quantity estimated in consideration of the future air temperature and load of the gas turbine.

(2) In some embodiments, in the life consumption estimation device described in the above (1), the gas turbine state quantity estimation unit is configured to estimate a future turbine inlet temperature as the gas turbine state quantity. The life consumption estimation unit is configured to estimate the life consumption of the at least one part, on the basis of the future turbine inlet temperature estimated by the gas turbine state quantity estimation unit.

The life consumption of many parts used in a gas turbine correlates with the turbine inlet temperature. Further, the turbine inlet temperature has a correlation with the load of the gas turbine and the air temperature.

Then, in the life consumption estimation device described in the above (2), a future turbine inlet temperature of the gas turbine is estimated based on the predicted air temperature information and the predicted load information, and the life consumption of a gas turbine part is estimated based on the estimated turbine inlet temperature. Thus, it is possible to accurately estimate the life consumption of the gas turbine part on the basis of the turbine inlet temperature estimated in consideration of the future air temperature and load of the gas turbine.

(3) In some embodiments, in the life consumption estimation device described in the above (1) or (2), the predicted air temperature information acquisition unit includes: a predicted air temperature input receiving unit (e.g., the above-described predicted air temperature input receiving unit 12) configured to receive input of the predicted air temperature information; and an air temperature frequency distribution generation unit (e.g., the above-described air temperature frequency distribution generation unit 14) configured to generate air temperature frequency distribution information indicating a frequency distribution of air temperatures for each time period in future, on the basis of past air temperature information regarding a past air temperature and the predicted air temperature information the input of which is received by the predicted air temperature input receiving unit. The gas turbine state quantity estimation unit is configured to estimate the gas turbine state quantity for each time period in future, on the basis of the air temperature frequency distribution information generated by the air temperature frequency distribution generation unit and the predicted load information acquired by the predicted load information acquisition unit.

Since the air temperature changes with time, it is desirable to estimate the gas turbine state quantity on the basis of the predicted air temperature for each time period in future in order to accurately estimate the gas turbine state quantity for each time period in future.

Then, in the life consumption estimation device described in the above (3), the air temperature frequency distribution information indicating a frequency distribution of air temperatures for each time period in future is generated in consideration of the past air temperature information and the predicted air temperature information, and the gas turbine state quantity is estimated for each time period in future on the basis of the air temperature frequency distribution information. Thus, it is possible to accurately estimate the gas turbine state quantity and the life consumption of the part in consideration of air temperature change over time.

(4) In some embodiments, in the life consumption estimation device described in the above (3), the predicted air temperature input receiving unit is configured to receive input of information regarding a daily minimum temperature as the predicted air temperature information.

The pattern of air temperature change over time in a day correlates with the daily minimum temperature. Therefore, as described in the above (4), by receiving the input of information on the daily minimum temperature, it is possible to accurately estimate the air temperature for each time period in future inconsideration of the minimum temperature. Thus, it is possible to accurately estimate the gas turbine state quantity and the life consumption of the part.

(5) In some embodiments, in the life consumption estimation device described in the above (3) or (4), the past air temperature information includes a plurality of change patterns of air temperature change over time in a day and an appearance frequency of each of the plurality of change patterns.

With the life consumption estimation device described in the above (5), it is possible to accurately estimate the air temperature for each time period in future in consideration of the plurality of change patterns of air temperature and their appearance frequencies in past. Thus, it is possible to accurately estimate the future gas turbine state quantity and the life consumption of the part.

(6) In some embodiments, in the life consumption estimation device described in the above (5), the device further comprises a storage unit (e.g., the above-described storage unit 16) storing the plurality of change patterns and the appearance frequency of each of the change patterns.

With the life consumption estimation device described in the above (6), it is possible to accurately estimate the air temperature for each time period in future on the basis of the plurality of change patterns and their appearance frequencies stored in the storage unit.

(7) In some embodiments, in the life consumption estimation device described in any one of the above (1) to (6), the predicted load information acquisition unit includes: a predicted load input receiving unit (e.g., the above-described predicted load input receiving unit 18) configured to receive input of the predicted load information, and a peak load factor estimation unit (e.g., the above-described peak load factor estimation unit 20) configured to estimate a peak load factor which is a ratio of time of a peak load in each time period in future, on the basis of past load information regarding a past load of the gas turbine and the predicted load information the input of which is received by the predicted load input receiving unit.

The peak load of the gas turbine has a dominant influence on the gas turbine state quantity (especially, turbine inlet temperature) over other loads. Therefore, as described in the above (7), by estimating the peak load factor for each time period in future on the basis of the past load information and the predicted load information, it is possible to accurately calculate the gas turbine state quantity (especially, the turbine inlet temperature) and the life consumption of the part for each time period in future, in consideration of the peak load factor.

(8) In some embodiments, in the life consumption estimation device described in the above (7), the predicted load input receiving unit is configured to receive a predicted value of a peak load for each time period in future and a predicted value of an average load for each time period in future as the predicted load information.

With the life consumption estimation device described in the above (8), it is possible to accurately estimate the peak load factor in consideration of the predicted value of the peak load and the predicted value of the average load. Thus, it is possible to accurately calculate the gas turbine state quantity and the life consumption of the part for each time period in future.

(9) In some embodiments, in the life consumption estimation device described in any one of the above (1) to (8), the predicted load information includes a predicted value of an availability factor of the gas turbine in future. The life consumption estimation unit is configured to estimate the life consumption, on the basis of the gas turbine state quantity estimated by the gas turbine state quantity estimation unit and the predicted value of the availability factor acquired by the predicted load information acquisition unit.

With the life consumption estimation device described in the above (9), it is possible to accurately estimate the life consumption of the part in consideration of the estimated future gas turbine state quantity and the predicted value of the availability factor.

(10) In some embodiments, in the life consumption estimation device described in any one of the above (1) to (9), the predicted load information includes a predicted number of starts of the gas turbine in future. The life consumption estimation unit is configured to estimate the life consumption, on the basis of the gas turbine state quantity estimated by the gas turbine state quantity estimation unit and the predicted number of starts acquired by the predicted load information acquisition unit.

With the life consumption estimation device described in the above (10), it is possible to accurately estimate the life consumption of the part in consideration of the estimated future gas turbine state quantity and the predicted number of starts.

(11) In some embodiments, in the life consumption estimation device described in any one of the above (1) to (10), the gas turbine state quantity estimation unit is configured to calculate a weighted mean of the gas turbine state quantity for each time period in future, on the basis of air temperature frequency distribution information indicating a frequency distribution of air temperatures for each time period in future and load frequency distribution information indicating a frequency distribution of loads for each time period in future.

With the life consumption estimation device described in the above (11), it is possible to accurately estimate the future gas turbine state quantity and the life consumption in consideration of the air temperature frequency distribution and the load frequency distribution for each time period in future.

(12) In some embodiments, in the life consumption estimation device described in the above (11), the gas turbine state quantity estimation unit is configured to use only a peak load of loads in the load frequency distribution information for calculating the weighted mean.

The peak load of the gas turbine has a dominant influence on the gas turbine state quantity estimation unit (especially, turbine inlet temperature) over other loads. Therefore, as described in the above (12), by using only the peak load in the load distribution for calculating the weighted mean, it is possible to accurately calculate the gas turbine state quantity and the life consumption of the part for each time period in future, with a simple calculation based on the peak load.

(13) In some embodiments, in the life consumption estimation device described in any one of the above (1) to (12), the device further comprises a life consumption addition unit configured to add the life consumption of the part estimated by the life consumption estimation unit to past life consumption of the part.

With the life consumption estimation device described in the above (13), it is possible to calculate the life consumption of the part from the past to a certain point in future.

(14) In some embodiments, in the life consumption estimation device described in any one of the above (1) to (13), the gas turbine state quantity estimation unit is configured to estimate a combustion gas temperature of each stage of the gas turbine as the gas turbine state quantity. The life consumption estimation unit is configured to, on the basis of the combustion gas temperature of a target stage estimated by the gas turbine state quantity estimation unit, estimate life consumption of a part at the target stage.

In a gas turbine, the temperature of the combustion gas drops downstream (rear stage side) in the flow direction of the combustion gas. Therefore, as in the above (14), by estimating the temperature of the combustion gas for each stage of the gas turbine and estimating the life consumption of the part at the target stage on the basis of the temperature of the combustion gas of the target stage, it is possible to accurately calculate the life consumption of the part.

REFERENCE SIGNS LIST

2 Life consumption estimation device
4 Predicted air temperature information acquisition unit
6 Predicted load information acquisition unit
8 Turbine inlet temperature estimation unit
9 Life consumption estimation unit
10 Life consumption addition unit
12 Predicted air temperature input receiving unit
14 Air temperature frequency distribution generation unit
16 Storage unit
18 Predicted load input receiving unit
20 Peak load factor estimation unit
72 CPU
84 Bus

The invention claimed is:

1. A life consumption estimation device for estimating life consumption of at least one part of a gas turbine, comprising:
 a memory configured to store instructions; and
 a processor configured to execute the instructions to:
 acquire predicted air temperature information regarding a future air temperature;
 acquire predicted load information regarding a future load of the gas turbine;
 estimate at least one gas turbine state quantity regarding a future state quantity of the gas turbine, on the basis of the predicted air temperature information acquired and the predicted load information acquired; and
 estimate the life consumption of the at least one part, on the basis of the at least one gas turbine state quantity estimated,
 wherein the processor is further configured to generate air temperature frequency distribution information indicating a frequency distribution of air temperatures for each time period in the future, on the basis of past air temperature information regarding a past air temperature and the predicted air temperature information,
 wherein the processor is configured to estimate the gas turbine state quantity for each time period in the future, on the basis of the air temperature frequency distribution information generated and the predicted load information acquired, and
 wherein the past air temperature information includes a plurality of change patterns of air temperature change over time in a day and an appearance frequency of each of the plurality of change patterns.

2. The life consumption estimation device according to claim 1,
 wherein the processor is configured to estimate a future turbine inlet temperature as the gas turbine state quantity, and
 wherein the processor is configured to estimate the life consumption of the at least one part, on the basis of the future turbine inlet temperature estimated.

3. The life consumption estimation device according to claim 1,
 wherein the processor is configured to receive input of information regarding a daily minimum temperature as the predicted air temperature information.

4. The life consumption estimation device according to claim 1, further comprising a storage device storing the plurality of change patterns and the appearance frequency of each of the change patterns.

5. The life consumption estimation device according to claim 1,
 wherein the processor is further configured to
 estimate a peak load factor which is a ratio of time of a peak load in each time period in the future, on the basis of past load information regarding a past load of the gas turbine and the predicted load information.

6. The life consumption estimation device according to claim 5,
 wherein the processor is configured to receive a predicted value of a peak load for each time period in the future and a predicted value of an average load for each time period in the future as the predicted load information.

7. The life consumption estimation device according to claim 1,
wherein the predicted load information includes a predicted value of an availability factor of the gas turbine in the future, and
wherein the processor is configured to estimate the life consumption, on the basis of the gas turbine state quantity estimated and the predicted value of the availability factor acquired.

8. The life consumption estimation device according to claim 1,
wherein the predicted load information includes a predicted number of starts of the gas turbine in the future, and
wherein the processor is configured to estimate the life consumption, on the basis of the gas turbine state quantity estimated and the predicted number of starts acquired.

9. The life consumption estimation device according to claim 1, wherein the processor is further configured to add the life consumption of the at least one part estimated to past life consumption of the at least one part.

10. A life consumption estimation device for estimating life consumption of at least one part of a gas turbine, comprising:
a memory configured to store instructions; and
a processor configured to execute the instructions to:
acquire predicted air temperature information regarding a future air temperature;
acquire predicted load information regarding a future load of the gas turbine;
estimate at least one gas turbine state quantity regarding a future state quantity of the gas turbine, on the basis of the predicted air temperature information acquired and the predicted load information acquired; and
estimate the life consumption of the at least one part, on the basis of the at least one gas turbine state quantity estimated,
wherein the processor is configured to calculate a weighted mean of the gas turbine state quantity for each time period in the future, on the basis of air temperature frequency distribution information indicating a frequency distribution of air temperatures for each time period in the future and load frequency distribution information indicating a frequency distribution of loads for each time period in the future.

11. The life consumption estimation device according to claim 10,
wherein the processor is configured to use only a peak load of loads in the load frequency distribution information for calculating the weighted mean.

12. A life consumption estimation device for estimating life consumption of at least one part of a gas turbine, comprising:
a memory configured to store instructions; and
a processor configured to execute the instructions to:
acquire predicted air temperature information regarding a future air temperature;
acquire predicted load information regarding a future load of the gas turbine;
estimate at least one gas turbine state quantity regarding a future state quantity of the gas turbine, on the basis of the predicted air temperature information acquired and the predicted load information acquired; and
estimate the life consumption of the at least one part, on the basis of the at least one gas turbine state quantity estimated,
wherein the processor is configured to estimate a combustion gas temperature of each stage of the gas turbine as the gas turbine state quantity, and
wherein the processor is configured to, on the basis of the combustion gas temperature of a target stage estimated, estimate life consumption of a part at the target stage.

* * * * *